(12) United States Patent
Bargeron et al.

(10) Patent No.: US 7,570,816 B2
(45) Date of Patent: Aug. 4, 2009

(54) SYSTEMS AND METHODS FOR DETECTING TEXT

(75) Inventors: David M Bargeron, Seattle, WA (US); Patrice Y Simard, Bellevue, WA (US); Paul A Viola, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 902 days.

(21) Appl. No.: 11/095,393

(22) Filed: Mar. 31, 2005

(65) Prior Publication Data

US 2006/0222239 A1    Oct. 5, 2006

(51) Int. Cl.
*G06K 9/62* (2006.01)
*G06K 9/34* (2006.01)
*G06F 7/00* (2006.01)

(52) U.S. Cl. .................. 382/224; 382/176; 707/101
(58) Field of Classification Search .................. 382/224, 382/176
See application file for complete search history.

(56) References Cited

U.S. PATENT DOCUMENTS

| | | | |
|---|---|---|---|
| 3,701,095 A | 10/1972 | Yamaguchi et al. | |
| 4,955,066 A | 9/1990 | Notenboom | |
| 5,109,433 A | 4/1992 | Notenboom | |
| 5,181,255 A | 1/1993 | Bloomberg | |
| 5,237,628 A | 8/1993 | Levitan | |
| 5,297,216 A | 3/1994 | Sklarew | |
| 5,465,353 A | 11/1995 | Hull et al. | |
| 5,499,294 A | 3/1996 | Friedman | |
| 5,526,444 A | 6/1996 | Kopec et al. | |
| 5,542,006 A | 7/1996 | Shustorovich et al. | |
| 5,594,809 A | 1/1997 | Kopec et al. | |
| 5,699,244 A | 12/1997 | Clark et al. | |
| 5,812,698 A | 9/1998 | Platt et al. | |
| 5,832,474 A | 11/1998 | Lopresti et al. | |
| 5,867,597 A | 2/1999 | Peairs et al. | |
| 5,999,653 A | 12/1999 | Rucklidge et al. | |
| 6,137,908 A | 10/2000 | Rhee | |
| 6,233,353 B1 * | 5/2001 | Danisewicz | 382/176 |

(Continued)

OTHER PUBLICATIONS

R. Lienhart, A. Kuranov, and V. Pisarevsky. Empirical analysis of detection cascades of boosted classifiers for rapid object detection. In DAGM, 2003.*

(Continued)

*Primary Examiner*—Bhavesh M Mehta
*Assistant Examiner*—Hadi Akhavannik
(74) *Attorney, Agent, or Firm*—Lee & Hayes, PLLC

(57) ABSTRACT

The subject invention relates to facilitating text detection. The invention employs a boosted classifier and a transductive classifier to provide accurate and efficient text detection systems and/or methods. The boosted classifier is trained through features generated from a set of training connected components and labels. The boosted classifier utilizes the features to classify the training connected components, wherein inferred labels are conveyed to a transductive classifier, which generates additional properties. The initial set of features and the properties are utilized to train the transductive classifier. Upon training, the system and/or methods can be utilized to detect text in data under text detection, wherein unlabeled data is received, and connected components are extracted therefrom and utilized to generate corresponding feature vectors, which are employed to classify the connected components using the initial boosted classifier. Inferred labels are utilized to generate properties, which are utilized along with the initial feature vectors to classify each connected component using the transductive classifier.

18 Claims, 10 Drawing Sheets

U.S. PATENT DOCUMENTS

| | | | |
|---|---|---|---|
| 6,279,014 | B1 | 8/2001 | Schilit et al. |
| 6,356,922 | B1 | 3/2002 | Schilit et al. |
| 6,393,395 | B1 | 5/2002 | Guha et al. |
| 6,397,212 | B1 | 5/2002 | Biffar |
| 6,470,094 | B1 | 10/2002 | Lienhart et al. |
| 6,487,301 | B1 | 11/2002 | Zhao |
| 6,523,134 | B2 | 2/2003 | Korenshtein |
| 6,546,385 | B1 | 4/2003 | Mao et al. |
| 6,580,806 | B1 | 6/2003 | Sato |
| 6,587,217 | B1 | 7/2003 | Lahey et al. |
| 6,594,393 | B1 | 7/2003 | Minka et al. |
| 6,658,623 | B1 | 12/2003 | Schilit et al. |
| 6,687,876 | B1 | 2/2004 | Schilit et al. |
| 6,869,023 | B2 | 3/2005 | Hawes |
| 6,928,548 | B1 | 8/2005 | Hale et al. |
| 6,938,203 | B1 | 8/2005 | Dimarco et al. |
| 7,010,751 | B2 | 3/2006 | Shneiderman |
| 7,024,054 | B2 | 4/2006 | Cahill et al. |
| 7,062,497 | B2 | 6/2006 | Hamburg et al. |
| 7,111,230 | B2 | 9/2006 | Euchner et al. |
| 7,120,299 | B2 | 10/2006 | Keskar et al. |
| 7,327,883 | B2 | 2/2008 | Polonowski |
| 7,373,291 | B2 | 5/2008 | Garst |
| 2002/0032698 | A1 | 3/2002 | Cox |
| 2002/0078088 | A1 | 6/2002 | Kuruoglu et al. |
| 2002/0116379 | A1 | 8/2002 | Lee et al. |
| 2003/0076537 | A1 | 4/2003 | Brown |
| 2003/0123733 | A1 | 7/2003 | Keskar et al. |
| 2003/0152293 | A1 | 8/2003 | Bresler et al. |
| 2004/0003261 | A1 | 1/2004 | Hayashi |
| 2004/0015697 | A1 | 1/2004 | de Queiroz |
| 2004/0078757 | A1 | 4/2004 | Golovchinsky et al. |
| 2004/0090439 | A1 | 5/2004 | Dillner |
| 2004/0107348 | A1 | 6/2004 | Iwamura |
| 2004/0189667 | A1 | 9/2004 | Beda et al. |
| 2004/0205542 | A1 | 10/2004 | Bargeron et al. |
| 2004/0205545 | A1 | 10/2004 | Bargeron et al. |
| 2004/0252888 | A1 | 12/2004 | Bargeron et al. |
| 2005/0138541 | A1 | 6/2005 | Euchner et al. |
| 2005/0165747 | A1 | 7/2005 | Bargeron et al. |
| 2005/0234955 | A1* | 10/2005 | Zeng et al. .................. 707/101 |
| 2006/0045337 | A1 | 3/2006 | Shilman et al. |
| 2006/0050969 | A1 | 3/2006 | Shilman et al. |

OTHER PUBLICATIONS

Taira, H. and M. Haruno (2001). Text Categorization Using Transductive Boosting. Proceedings of ECML-01, 12th European Conference on Machine Learning. Freiburg, DE, Springer Verlag, Heidelberg, DE: 454-465.*
S. Marinai, et al., "Recognizing Freeform Digital Ink Annotations" Proceedings of the 6th International Workshop on Document Analysis Systems, 2004, vol. 2163, pp. 322-331.
G. Golovchinsky, et al., "Moving Markup: Repositioning Freeform Annotation" UIST 02. Proceedings of the 15th Annual ACM Symposium on user Interface Software and Technology, 2002, vol. conf. 15, pp. 21-29.
European Search Report dated Dec. 29, 2006, mailed for European Patent Application Serial No. 05 108 068.7, 2 Pages.
Murphey, et al. "Neural Learning Using AdaBoost" (2001) IEEE, 6 pages.
U.S. Appl. No. 11/165,070, David Bargeron.
U.S. Appl. No. 11/171,064, David Bargeron.
Vinajak R. Borkar, et al., Automatically extracting structure from free text addresses, 2000, 6 pages, In Bulletin of the IEEE Computer Society Technical committee on Data Engineering. IEEE.
Remco Bouckaert, Low level information extraction: A bayesian network based approach, 2002, 9 pages, In Proceedings of TextML 2002, Sydney, Australia.
Claire Cardie, et al., Proposal for an interactive environment for information extraction, 1998, 12 pages, Technical Report TR98-1702, 2.
Rich Caruana, et al., High precision information extraction, Aug. 2000, 7 pages. In KDD-2000 Workshop on Text Mining.
M. Collins, Discriminative training methods for hidden markov models : Theory and experiments with perception algorithms, Jul. 2002, p. 1-8, In Proceedings of Empirical Methods in Natural Language Processing (EMNLP02).
Corinna Cortes, et al., Support-vector networks. Machine Learning, 1995, 20(3): 273-297.
Y. Freund, et al., Large margin classification using the perceptron algorithm, Machine earning, 37(3):277-296.
Y. Freund, et al., Experiments with a new boosting algorithm, 1996, In International Conference on Machine Learning, pp. 148-156.
T. Kristjansson, et al., Interactive information extraction with constrained conditional random fields, 2004, In Proceedings of the 19th international conference on artificial intelligence, AAAI. pp. 412-418.
John Lafferty, et al., Conditional random fields: Probabilistic models for segmenting and labeling sequence data, 2001, In Proc. 18th International Conf. on Machine Learning, pp. 282-289. Morgan Kaufmann, San Francisco, CA.
M. Marcus, et al., The penn treebank: Annotating predicate argument structure, 1994, pp. 114-119.
Andrew McCallum, Efficiently inducing features of conditional random fields, 2003, 8 pages, In Nineteenth Conference on Uncertainty in Artificial Intelligence (UAI03).
Andrew McCallum, et al., Early results for named entity recognition with conditional random fields, feature induction and web-enhanced lexicons, 2003, 4 pages, In Hearst/Ostendorf, Eds, HLT-NAACL, Ass'n for Computational Linguistics, Edmonton, Alberta, Canada.
Kamal Nigam, et al., Using maximum entropy for text classification, 1999, 7 pages, In Proceedings of the IJCAI'99 Workshop on Information Filtering.
David Pinto, et al., Table extraction using conditional random fields, 2003, 8 pages, In Proceedings of the ACM SIGIR'03, Jul. 28-Aug. 1, 2003, Toronto, Canada.
L.R. Rabiner, A tutorial on hidden markov models and selected applications in speech recognition, 1989, In Proceedings of the IEEE, vol. 77, pp. 257-286.
Fei Sha, et al., Shallow parsing with conditional random fields. In Hearst/Ostendorf, Eds, 2003, HLT-NAACL: Main Proceedings, pp. 213-220, Ass'n for Computational Linguistics, Edmonton, Alberta, Canada.
J. Stylos, et al., Citrine:providing intelligent copy-and-paste, 2005, In Proceedings of ACM Symposium on User Interface Software and Technology (UIST 2004), pp. 185-188.
B. Taskar, et al., Max-margin parsing, 2004, 8 pages, In Empirical Methods in Natural Language Processing (EMNLP04).
S. Mao, et al., Document structure analysis algorithms: A literature survey, Jan. 2003, vol. 5010, pp. 197-207, In Proc. SPIE Electronic Imaging.
M. Krishnamoorthy, et al., Syntactic segmentation and labeling of digitized pages from technical journals, 1993, IEEE Transactions on Pattern Analysis and Machine Intelligence, vol. 15, pp. 737-747.
J. Kim, et al., Automated labeling in document images, Jan. 2001, p. 1-12, In Document Recognition and Retrieval VIII, vol. 4307. Available online at http://archive.nlm.nih.gov/pubs/kim/spie2001/spie2001.pdf, last checked Apr. 2, 2006.
D. Niyogi, et al., Knowledge-based derivation of document logical structure, 1995, pp. 472-475, In Third International Conference on Document Analysis and Recognition, Montreal, Canada.
A. Conway, Page Grammars and Page Parsing: A Syntactic Approach to Document Layout Recognition, 1993, In Proceedings of the 2nd International Conference on Document Analysis and Recognition, Tsukuba Science City, Japan, pp. 761-764.
E.G. Miller, et al., Ambiguity and constraint in mathematical expression recognition, 1998, 8 pages, In Proceedings of the National Conference of Artificial Intelligence. American Association of Artificial Intelligence.

T. Tokuyasu, et al., Turbo recognition: a statistical approach to layout analysis, 2001, in Proceedings of the SPIE, San Jose, CA, vol. 4307, pp. 123-129.

T. Kanungo, et al., Stochastic language model for style-directed physical layout analysis of documents, 2003, p. 583-596, In IEEE Transactions on Image Processing, vol. 5, No. 5.

D. Blostein, et al., Applying compiler techniques to diagram recognition, In Proceedings of the 16th International Conference on Pattern Recognition, 2002, vol. 3, pp. 123-136.

J. F. Hull, Recognition of mathematics using a two dimensional trainable context-free grammar, Master's thesis, MIT, Jun. 1996, 101 pages.

N. Matsakis, Recognition of handwritten mathematical expressions, May 1999, pp. 1-59, Master's thesis, Massachusetts Institute of Technology, Cambridge, MA.

J. Lafferty, et al., Conditional Random Fields: Probabilistic Models for Segmenting and Labeling Sequence Data, 2001, In Proceedings of the 18th International Conference on Machine Learning, Morgan Kaufmann, San Francisco, CA, pp. 282-289.

E. Charniak, et al., Edge-Based Best-First Chart Parsing, 1998, In Proceedings of the 14th National Conference on Artificial Intelligence, pp. 127-133.

D. Klein, et al., A* parsing: Fast Exact Viterbi Parse Selection, Stanford University, 2001, 8 pages, Tech. Rep. dbpubs/2002-16.

Y. Freund, et al., A Decision-Theoretic Generalization of On-line Learning and an Application to Boosting, 1995, In Computational Learning Theory: Eurocolt '95, Springer-Verlag, pp. 23-37.

I. Philips, et al., Cd-rom Document Database Standard, In Proceedings of the 2nd International Conference on Document Analysis and Recognition (ICDAR), 1993, pp. 478-483.

P. Viola, et al., Rapid Object Detection Using a Boosted Cascade of Simple Features, 2001, pp. 1-9, In Proceedings of the IEEE Conference on Computer Vision and Pattern.

T. Breuel, High Performance Document Layout Analysis, 10 pages, In 2003 Symposium on Document Image Understanding Technology, Greenbelt Maryland.

R. Zanibbi, et al., A Survey of Table Recognition: Models, Observations, Transformations, and Inferences, International Journal of Document Analysis and Recognition, 2004, vol. 7, No. 1. pp. 1-16.

K. F. Chan, et al., Mathematical Expression Recognition: A Survey, 2000, International Journal on Document Analysis and Recognition, vol. 3, pp. 3-15.

E. Charniak, Statistical Techniques for Natural Language Parsing, AI Magazine, 1997, vol. 18, No. 4, pp. 33-44.

M. Kay, Chart Generation, In Proceedings of the 34th Annual Meeting of the Association for Computational Linguistics (ACL '96), Santa Cruz, California, 1996, pp. 200-204.

M. Viswanathan, et al., Document Recognition: An Attribute Grammar Approach, Mar. 1996, In Proc. SPIE vol. 2660, Document Recognition III, Vincent/Hull, Eds., pp. 101-111.

C.D. Manning, et al., Foundations of Statistical Natural Language Processing. The MIT Press, 1999, pp. 1-3.

Tobias Schefer, et al., Active Hidden Markov Models For Information Extraction, In Advances in Intelligent Data Analysis, 4th International Conference, IDA 2001, pp. 309-318.

P. Chou, Recognition Of Equations Using a 2-D Stochastic Context-Free Grammar, In SPIE Conference on Visual Communications and Image Processing, Philadelphia, PA, 1989, pp. 852-863.

M. Kay, Algorithm Schemata And Data Structures In Syntactic Processing, 1986, pp. 35-70.

Michael Shilman, et al., Spatial Recognition and Grouping of Text and Graphics, Eurographics Workshop on Sketch-Based Interfaces and Modeling, 2004, 5 pages, Hughes/Jorge, Eds.

Michael Shilman, et al., Recognition and Grouping of Handwritten Text in Diagrams and Equations, IWFHR 2004, Sep. 2004, pp. 69-77, Tokyo, Japan.

Michael Shilman, et al., Recognizing Freeform Digital Ink Annotations, IAPR International Workshop on Document Analysis Systems, Sep. 8-10, 2004, 12 pages, Florence, Italy.

European Search Report dated Feb. 1, 2006 for European Patent Application No. EP05000750. 7 pages.

J.J. Hull. "Document Image Matching and Retrieval with Multiple Distortion-Invariant Descriptors". Document Analysis Systems, World Scientific Publishing Co. 1995. pp. 379-396. Retrieved from the internet: http://rii.richoh.com/{hull/pubs/hull_das94.pdf>. Retrieved on Dec. 6, 2005.

J.J. Hull, et al. "Document Image Matching Techniques". Symposium on Document Image Understanding Technology, Apr. 30, 1997, pp. 31-35.

Wang Shin-Ywan, et al. "Block selection: a method for segmenting a page image of various editing styles." Document Analysis and Recognition, 1995. Proceedings of the Third International Conference on Montreal, Quebec, Canada. Aug. 14-16, 1995. pp. 128-133. Los Alamitos, CA, USA, IEEE Computer Soc., US, vol. 1.

V. Eglin, et al. "Document page similarity based on layout visual saliency: application to query by example and document classification". Document Analysis and Recognition, 2003. Proceedings of the 7th International Conference. Aug. 3-6, 2003. Piscataway, NJ. IEEE, Aug. 3, 2003, pp. 1208-1212.

C.L. Tan, et al. "Text extraction using pyramid." Pattern Recognition, Jan. 1998, pp. 63-72, vol. 1, No. 1, Elsevier, Kidlington, GB.

H. Peng, et al. "Document image template matching based on component block list". Pattern Recognition Letters, Jul. 2001, pp. 1033-1042, vol. 22, No. 9, North-Holland Publ. Amsterdam, NL.

D. Doermann. "The Index and Retrieval of Document Images: A Survey". Computer Vision and Image Understanding, Jun. 1998, pp. 287-298, vol. 70, No. 3, Academic Press, San Diego, CA, US.

D. Doermann, et al. "The detection of duplicates in document image databases." Proceedings of the 4th International Conference on Document Analysis and Recognition. Ulm, Germany, Aug. 18-20, 1997, pp. 314-318, Proceedings of the ICDAR, Los Alamitos, IEEE Comp. Soc. US, vol. II.

S. Mitaim, et al. "Neutral fuzzy agents that learn a user's preference map". Digital Libraries, 199. ADL '97 . Proceedings, IEEE International Forum on Research and Technology Advances in Washington, D.C. , US May 7-9, 1997, Los Alamitos, IEEE Comp. Soc. US, May 7, 1997, pp. 25-35.

B. Erol, et al. "Institute of Electrical and Electronics Engineers: Linking presentation documents using image analysis". Conference Record of the 37th Asilomar Conference on Signals, Systems, & Computers. Pacific Grove, CA, US, Nov. 9-12, 2003. pp. 97-101. Asilomar Conference on Signals, Systems and Computers, New York, NY, IEEE, vol. 1 of 2.

Benolin Jose, et al. "Vector Based Image Matching for Indexing in Case Based Reasoning Systems". 4th German Workshop on Case-based Reasoning-System Development and Evaluation, 1996, pp. 1#7.

R. Hauck. Partial European Search Report. Apr. 15, 2005. 2 pages. Munich, Germany.

Tung-Shou Chen, et al., "A New Search Engine for Chinese Document Image Retrieval Based on Chinese Character Segmentation Features". International Journal of Computer Processing of Oriental Languages, 2002, pp. 417-431. vol. 14, No. 4.

Jonathan J. Hull, et al., "Document Image Similarity and Equivalence Detection". ICDAR'97, 1997, pp. 308-312, vol. 1, Ulm, Germany.

John F. Cullen, et al., "Document Image Database Retrieval and Browsing using Texture Analysis". ICDAR'97, 1997, pp. 718-721, Ulm, Germany.

Nevin Heintze, "Scalable Document Fingerprinting (Extended Abstract)". Proceedings of the Second USENIX Workshop on Electronic Commerce, 1996, pp. 1-10.

Narayanan Shivakumar, et al., "The SCAM Approach to Copy Detection in Digital Libraries". D-Lib Magazine, 1995, 9 pages.

Sergey Brin, et al., "Copy Detection Mechanisms for Digital Documents". Proceedings of the ACM SIGMOD Annual Conference, 1995, pp. 1-21.

Michael Shilman, et al., "Recognizing Freeform Digital Ink Annotations", IAPR International Workshop on Document Analysis Systems, Sep. 8-10, 2004, 12 pages, Florence, Italy.

Ming Ye, et al., "Document Image Matching and Annotation Lifting". Proceedings of the 6th International Conference on Document Analysis and Recognition (ICDAR 2001), Seattle, Washington, Sep. 10-13, 2001, pp. 753-760.

Michael Collins, et al., "Logistic Regression, AdaBoost, and Bregman Distances", Machine Learning, 48(1/2/3) 2002, pp. 1-26.

Thomas M. Cormen, et al., "Introduction to Algorithms", Cambridge, MA: The MIT Press, 1990, p. 448.

Hans P. Graf, et al., "Analysis of Complex and Noisy Check Images", Proceedings of IEEE International Conference on Image Processing (KIP-95). IEEE Computer Society Press, 1995, pp. 316-319.

Patrice Y. Simard, et al., "An Efficient Binary Image Activity Detector Based on Connected Components", International Conference on Accoustic, Speech and Signal Processing (ICASSP), Montreal, May 2004, pp. 229-232.

Yoav Freund, et al., "Experiments with a New Boosting Algorithm". Machine Learning: Proceedings of the Thirteenth International Conference, 1996. pp. 148-156.

Ihsin Phillips, et al., "CD-ROM Document Database Standard" Proc. Second Int'l Conf. on Document Analysis and Recognition, 1993, pp. 478-483.

Yefeng Zheng, et al., "Machine Printed Text and Handwriting Identification in Noisy Document Images" In IEEE Transactions on Pattern Analysis and Machine Intelligence, Mar. 2003, pp. 337-353, vol. 26, No. 3.

David Bargeron, et al. "Boosting-Based Transductive Learning for Text Detection". Proceedings of the 8th International Conference on Document Analysis and Recognition (ICDAR'05), pp. 1166-1171.

"About Virtual Desktop Managers". Accessible at http://www.virtual-desktop.info. Last accessed on May 17, 2006, 3 pages.

Vladimir N. Vapnik, Statistical Learning Theory, 1998, pt. 1, 62 pages (front cover-40).

Vladimir N. Vapnik, Statistical Learning Theory, 1998, pt. 2, 62 pages (41-100).

Vladimir N. Vapnik, Statistical Learning Theory, 1998, pt. 3, 62 pages (101-162).

Vladimir N. Vapnik, Statistical Learning Theory, 1998, pt. 4, 62 pages (163-226).

Vladimir N. Vapnik, Statistical Learning Theory, 1998, pt. 5, 60 pages (227-287).

Vladimir N. Vapnik, Statistical Learning Theory, 1998, pt. 6, 60 pages (288-348).

Vladimir N. Vapnik, Statistical Learning Theory, 1998, pt. 7, 62 pages (349-413).

Vladimir N. Vapnik, Statistical Learning Theory, 1998, pt. 8, 50 pages (414-464).

Vladimir N. Vapnik, Statistical Learning Theory, 1998, pt. 9, 41 pages (465-505).

Vladimir N. Vapnik, Statistical Learning Theory, 1998, pt. 10, 35 pages (506-540).

Vladimir N. Vapnik, Statistical Learning Theory, 1998, pt. 11, 35 pages (541-576).

Vladimir N. Vapnik, Statistical Learning Theory, 1998, pt. 12, 65 pages (577-642).

Vladimir N. Vapnik, Statistical Learning Theory, 1998, pt. 13, 45 pages (643-686).

Vladimir N. Vapnik, Statistical Learning Theory, 1998, pt. 14, 50 pages (687-back cover).

Michael Collins, et al., "Logistic Regression, AdaBoost, and Bregman Distances", Machine Learning, 48(1/2/3) 2002.

Vladimir N. Vapnik, Statistical Learning Theory 1998. Wiley.

Ihsin Phillips, et al., "CD-ROM Document Database Standard" Proc. Second Int'l Conf. on Document Analysis and Recognition, pp. 478-483, 1993.

Yefeng Zheng, et al., "Machine Printed Text and Handwriting Identification in Noisy Document Images" In IEEE Transactions on Pattern Analysis and Machine Intelligence vol. 26, No. 3, Mar. 2003. pp. 337-353.

Sriram Ramachandran and Ramanujan Kashi, "An Architecture for ink Annotations on Web Documents", Proceedings of the Seventh International Conference on Document Analysis and Recognition, Aug. 3-6, 2003 pp. 256-260 vol. 1 Retrieved from IEEE Xplore on Sep. 27, 2006.

Ivan Poupyrev, Numada Tomokazu and Suzanne Weghorst, "Virtual Notepad: Handwriting in Immersive VR", IEEE, Proceedings of VRAIS' Atlanta, Georgia, Mar. 1998 Retrieved from CiteSeer on Sep. 28, 2006.

Marcel Gotze, Stefan Schlechtweg and Thomas Strothotte, "The Intelligent Pen—Toward a Uniform Treatment of Electronic Documents", 2002 Retrieved from CiteSeer on Sep. 28, 2006.

OA Dated Feb. 5, 2009 for U.S. Appl. No. 10/934,306, 42 pages.

OA Dated Mar. 5, 2009 for U.S. Appl. No. 10/927,452, 21 pages.

Bargeron et al, "Reflowing Digital Ink Annotations," Apr. 5-10, 2003, ACM, vol. 5, Issue No. 1, pp. 385-392.

Ellis et al, "A Collaborative Annotation System for Data Visualization," May 25-28, 2004, ACM, pp. 411-414.

OA Dated Jul. 25, 2008 for U.S. Appl. No. 11/171,064, 15 pages.

OA Dated Jul. 28, 2008 for U.S. Appl. No. 10/934,306, 34 pages.

OA Dated Oct. 21, 2008 for U.S. Appl. No. 10/927,452, 22 pages.

OA Dated Oct. 3, 2008 for U.S. Appl. No. 11/165,070, 11 pages.

* cited by examiner

SYSTEMS AND METHODS FOR DETECTING TEXT

TECHNICAL FIELD

The subject invention generally relates to text classifiers, and more particularly to systems and methods that facilitate detecting text within data through machine learning techniques.

BACKGROUND OF THE INVENTION

Technological advances in computer hardware, software, and networking have lead to efficient, cost effective computing systems (e.g., desktop computers, laptops, handhelds, cell phones, servers . . . ) that can communicate with each other from essentially anywhere in the world. Such systems continue to evolve into more reliable, robust and user-friendly systems. As a consequence, more and more industries and consumers are purchasing computers and utilizing them as viable electronic alternatives to traditional paper and verbal media for exchanging information. Many industries and consumers are leveraging computing technology to improve efficiency and decrease cost. For instance, consumers can scan and store documents, create an album of digital images with text overlays, search and retrieve specific information (e.g., web pages with various types of data), upload pictures from digital cameras, view financial statements, transmit and/or receive digital facsimiles, exchange correspondence (e.g., email, chat rooms, voice over IP . . . ), etc.

The data available to computing systems includes text, images, audio, video, drawings, tables, etc. In addition, the data can include any combination thereof. For example, printed text often appears in many types of images; a scan of a printed page will often contain multiple components including text, images, and line drawings; and photographs often portray scenes in which text plays a meaningful role. Automatic text detection is a key technology in many applications involving these types of data. For instance, automatic text detection can be utilized to identify the parts of a printed document image to which Optical Character Recognition (OCR) should be applied. It can also be used as part of a broader analysis of an entire page's layout, and/or to quickly identify text in photographic images that might lead to a richer understanding of the rest of the image. The text in any given image can take on a wide variety of forms. The characters representing text may be large or small; white, black, or colored; aligned in rows or columns; appear together or in isolation, for example. Non-text regions can be relatively complex since they can include any sort of object or drawing.

Conventional text detection techniques are designed and tested with many types of images. One particular difficult situation where robustness is important is when the image includes artifacts such as dithering patterns. In general, dithering occurs rather frequently in real document images, and can easily confuse a text detector when the dithering is adjacent to text. This may be because dithering dots are often indistinguishable from things like the dots on i's. Dithering dots further away from text are often more easily distinguishable. Many dithering dots share a lot of qualities in common, and may even be identical, regardless of whether they are near text or not. Since detection of most dithering dots is relatively easy, a model for the characteristics of the dominant dithering components can be used to facilitate the detection of dots closer to text. In other words, dots close to text may actually be dithering because they look like other dots that are unambiguously identified as dithering. This type of processing is broadly called transduction. In transduction, the set of test samples are classified as a group. The transduction approach allows the unique statistical structure of the group to play a role in the classification. Another technique that can be utilized in text detection system is inductive classification. With this classification approach, test samples are treated independently rather than as a group.

In general, with conventional text detection approaches achieving better than an 85% detection rate is not very difficult. The remaining undetected text is often statistically unusual, and distinguishing it from other document elements and/or sensor noise in the image can be quite difficult. For automatic text detection to be practically useful, however, a text detector should have an accuracy as close to perfect as possible, while being fast and robust. Therefore, there is a need to improve detection of statistically unusual undetected text, overall text detection rate, robustness and performance.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to systems and methods that facilitate text detection. The overall framework constructs a diverse set of input features, and then utilizes machine learning to select and combine the most salient of them into a robust and efficient detector. Essentially any known machine learning algorithm can be employed in connection with the invention. For instance, a boosted classifier, which typically works well with diverse feature sets, can be utilized to select and combine features. In addition, a transductive classifier can be utilized in connection with the boosted classifier to improve results. Such text detection system can provide accurate results in a fast and efficient manner. For example, dithering patterns pose various challenges to text detection in images, and can easily confuse a text detector when the dithering is adjacent to text since dithering dots are often indistinguishable from things like the dots on i's. The subject invention contemplates utilizing machine learning in a novel manner to improve text detection in the presence of dithering through improving the classification of obscure and unusual dithering.

In various aspects of the invention, text detection systems and/or methods that utilize one or more classifiers such as boosted classifiers and/or transductive classifiers are provided. Classifier training is achieved by providing a labeled set of training data that at least includes connected components and associated text/non-text labels. Basic features are extracted from the connected components and aggregated as feature vectors. A boosted classifier is then trained with the original labels and the feature vectors, and the trained classifier is utilized to classify each connected component represented by its feature vector. Inferred labels are employed to bin the connected components over one or more histograms, wherein properties are computed for each bin. These properties are appended to the feature vectors and utilized along with the labeled training data to train a second classifier—a boosted or transductive classifier. Once trained, these classifiers can be used in combination to detect text in novel images. For example, upon receiving unlabeled data connected components can be identified, and feature vectors can be generated from these connected components. The boosted classifier can be utilized to classify each connected component, represented by its feature vector, wherein inferred labels can be employed to bin the connected components over one or more histograms. Properties can be computed for each bin and appended to the feature vectors. The connected components, represented by respective expanded feature vector, can then be classified via the transductive classifier. In other aspects of the invention, methods for training and detecting text are provided.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION OF THE INVENTION

Figure 1:
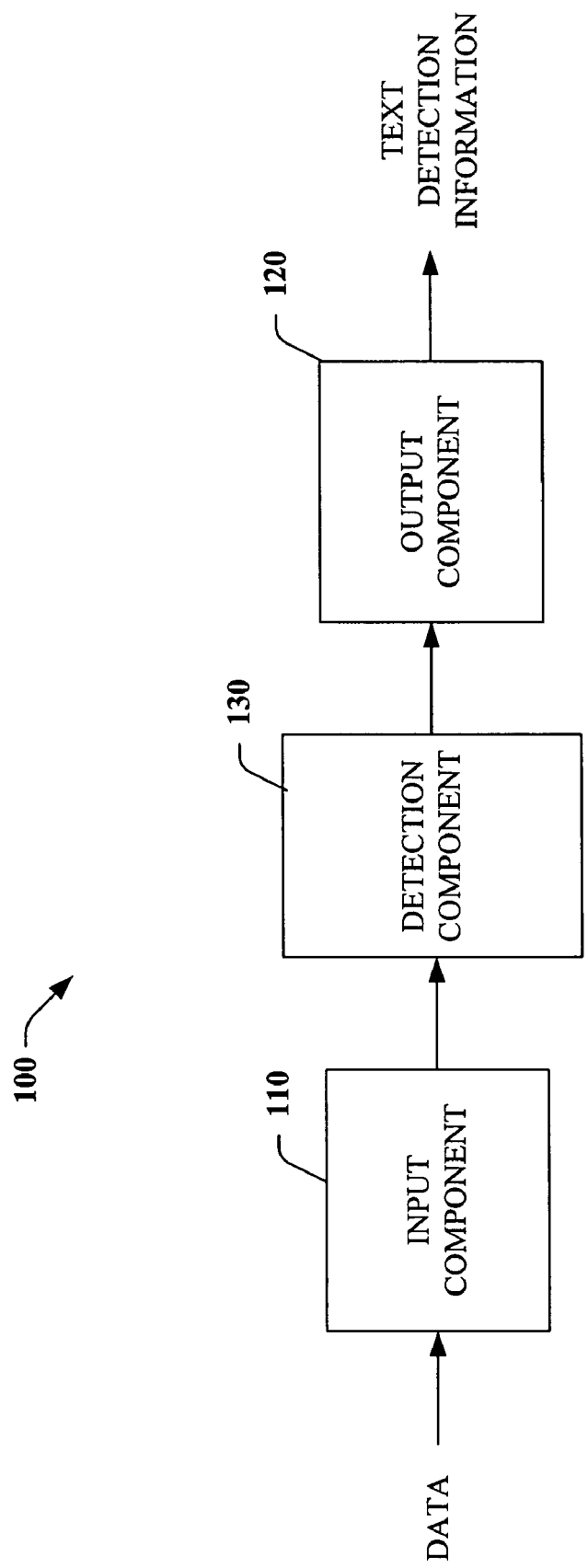
FIG. 1 illustrates an exemplary system that detects text that is embedded within various types of data.

The subject invention relates to systems and methods that facilitate text detection. The systems and methods utilize a diverse set of input features and machine learning to select and combine the most salient features to render a robust and efficient text detector. The systems and methods employ a boosted classifier, which typically works well with diverse feature sets, in connection with a transductive classifier to provide for enhanced classification. The text detection systems and methods can provide accurate results in a fast, robust, and efficient manner. For example, the subject invention can improve text detection in the presence of dithering through improving the classification of obscure and unusual dithering.

Terms such as "component," "system," "classifier" and variations thereof are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program, a computer, and an industrial controller. By way of illustration, both an application running on a server and the server can be components. One or more components may reside within a process and/or thread of execution and a component may be localized on one computer and/or distributed between two or more computers (e.g., via data packets and signals between the computers), and/or modules communicating therewith.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

FIG. 1 illustrates a system 100 that facilitates detecting text within data. In general, the data can include text, images, video, drawings, tables, etc. and/or any combination thereof, and can be associated with a document, a spreadsheet, an image, a page, a web page, a drawing, and the like. For example, the data can include printed text within an image. For instance, text can be captured in a photograph, added to the image as an overlay, hand-written (e.g., via a digital pen or writing utensil prior to scanning), etc. Photographs often portray scenes in which text plays a meaningful role. In another example, the data can be a scan of a page that includes multiple components including, but not limited to, text, images, and line drawings, assembled individually and/or in combination with each other. In yet another example, the text can be within a document such as a word processing document, a spreadsheet, a web page, etc.

Text associated with such data can be formatted in a wide variety of forms. For instance, text characters may be large or small; white, black, or colored; in rows or columns; together or in isolation; in a similar or disparate font type; print or script; in one or more languages, etc. Automatic detection of text within data can facilitate many applications that operate on such data. For instance, automatic text detection can be utilized to identify the parts of a printed document image to which OCR should be applied. It can also be used as part of a broader analysis of an entire page's layout, and/or to quickly identify text in photographic images that might lead to a better understanding of the rest of the image. The system 100 can be employed to facilitate identifying text in such data.

The system 100 includes an input component 110, an output component 120, and a detection component 130. These components can work in connection with one or more state machines, including, but are not limited to, desktop computers, workstations, mainframes, laptops, tabletops, handhelds, PDA's, cell phones, entertainment centers, robots, etc. For example, these components can be stored and executed within one or more state machines, across distributed processing systems, in dedicated devices, in cooperation with a text detection system, etc. The input component 110 and/or the output component 120 can provide various adapters, connectors, protocols, channels, etc. These entities can be employed to receive various forms of data (e.g., raw data, processed data, scanned data, images, drawings, pictures, pages . . . ) that can include text, and to output a decision as to whether a particular component of the data is text, the detected text and/or information that can be utilized to detect text (e.g., for subsequent processing).

The detection component 130 can employ various machine learning techniques, algorithms, approaches, etc. to identify and/or detect text in data. For example, the detection component 130 can employ a machine learning algorithm that can reason about or infer text in data from a set of observations, features, properties, and/or components of data. Inference can be employed to identify text, a context and/or can generate a probability distribution over the input data and/or components identified within as potential text. Such inferences can be probabilistic—that is, the computation of a probability distribution over entities identified within the data. Inference can also refer to techniques employed for rendering higher-level decisions.

It is to be appreciated that the detection component 130 can optionally be utilized to facilitate detecting one or more other components within data. For example, the detection component 130 can additionally or alternatively detect, identify and/or detect video, images, drawings, etc. and/or any combination thereof in data.

Figure 2:
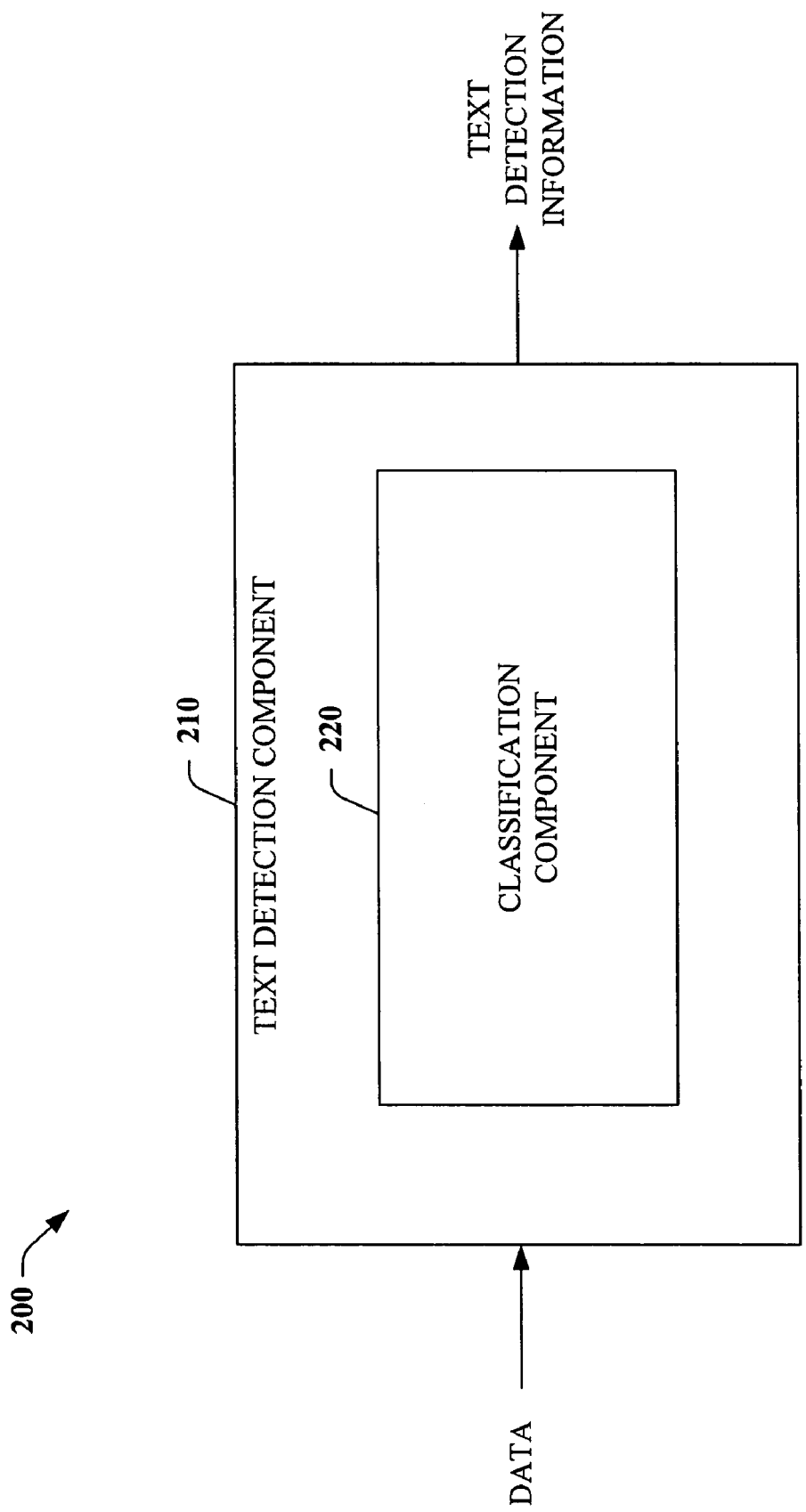
FIG. 2 illustrates an exemplary system that employs a classification component to detect text within data.

FIG. 2 illustrates a system 200 that facilitates detecting text within data such as, for example, documents, pages, images, video, drawings, tables, etc. and/or any combination thereof. The system 200 includes a text detection component 210 (which can be substantially similar to the detection component 130 of FIG. 1) that can employ various machine learning techniques, algorithms, approaches, etc. to identify and/or detect text in data. Such data can be provided to the text detection component 210, wherein the text detection component 210 can identify text within the data, output the text, and/or provide information that can be utilized to identify and/or extract the text from the data. For instance, information that can be utilized by another component to identify parts of a printed document image to which OCR should be applied. In another instance, the information can also be utilized to identify text in photographic images that might provide a better understanding of the image. In yet another instance, the information can be utilized to improve text detection in the presence of dithering through improving the classification of obscure and unusual dithering.

The text detection component 210 includes a classification component 220 that classifies components of the data as text. The classification component 220 can include one or more classifiers and/or other machine learning components. Such components can employ various classification (explicitly and/or implicitly trained) schemes and/or systems (e.g., boosted classifiers, transductive classifiers, inductive classifiers, support vector machines, neural networks, expert systems, Bayesian belief networks, fuzzy logic, data fusion engines . . . ) in connection with performing automatic text detection in accordance with the subject invention.

In general, a classifier is a function that maps an input attribute vector, $x=(x1, x2, x3, x4, \ldots, xn)$, to a confidence that the input belongs to a class, that is, $f(x)$=confidence (class). Such classification can employ a probabilistic and/or statistical-based analysis (e.g., factoring into the analysis utilities and costs) to automatically differentiate text from other entities within an image. One example of a suitable classifier is a support vector machine (SVM), which, in general, operates by finding a hypersurface in the space of possible inputs, wherein the hypersurface attempts to split triggering criteria from non-triggering criteria. This can make the classification suitable for testing samples, data, etc. that is near, but not identical to training data. Other directed and undirected model classification approaches include, naïve Bayes, Bayesian networks, decision trees, neural networks, fuzzy logic models, and probabilistic classification models providing different patterns of independence, for example. Classification as used herein also is inclusive of statistical regression that is utilized to develop models of priority.

Figure 3:
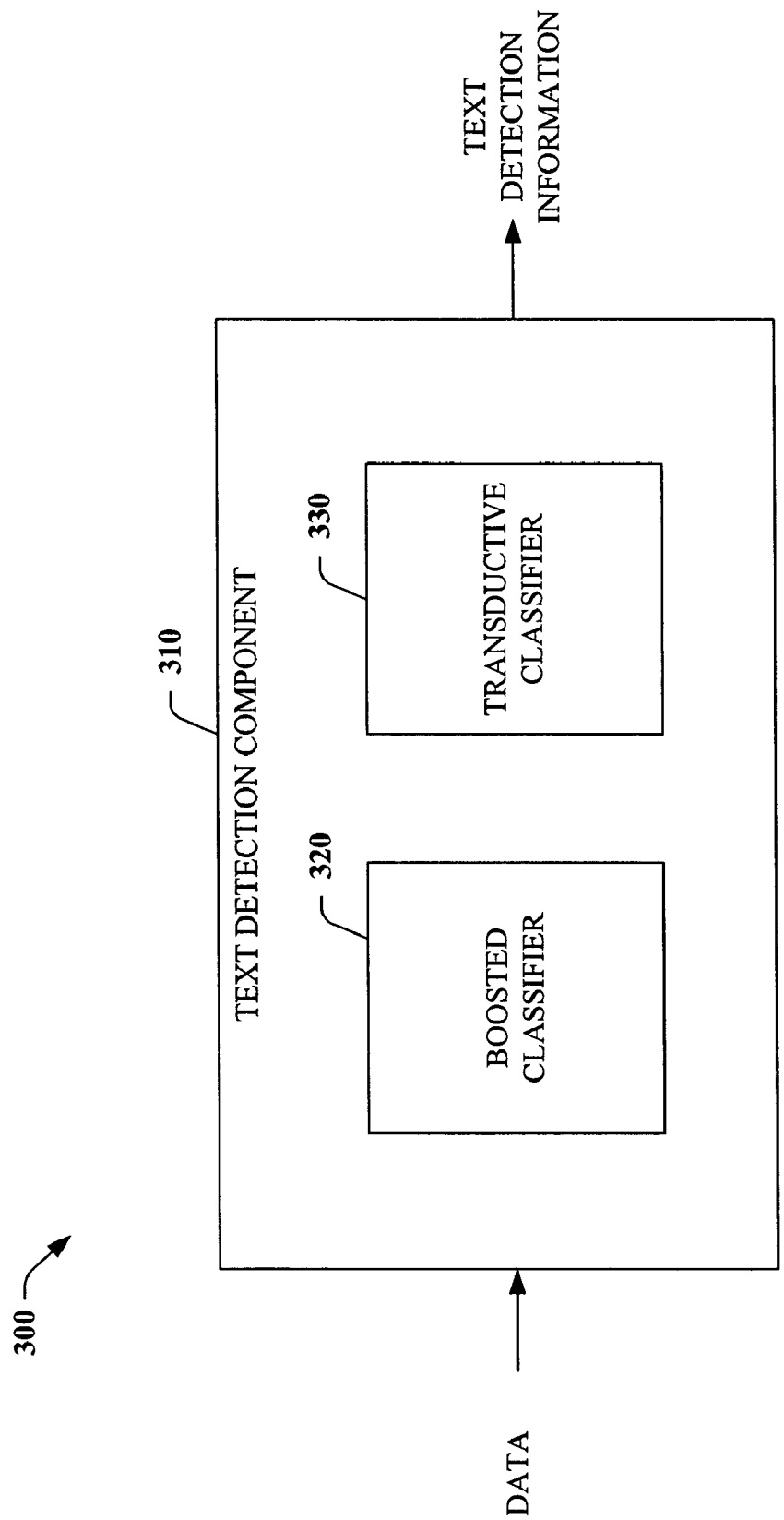
FIG. 3 illustrates an exemplary system that employs one or more classifiers to facilitate detecting text within data.

FIG. 3 illustrates a system 300 that employs one or more classifiers to facilitate detecting text within data. The system 300 includes a text detection component 310, which can receive data such as documents, pages, images, video, drawings, tables, etc. and/or any combination thereof, and can be utilized to locate and extract text from the data and/or provide information that can be utilized to extract text from the data (e.g., in connection with OCR). It is to be appreciated that such data can be from magazines, journals, document databases, and the like.

The text detection component 310 can include a boosted classifier 320 and a transductive classifier 330, both of which can be can be trained and utilized in combination to detect text. In general, the boosted classifier 320 can be trained through various training techniques, algorithms, etc., including AdaBoost, which provide a simple and efficient mechanism for training and combining a set of classifiers. Typically, such classifier is capable of labeling data with an error within a probability or confidence level (e.g., no less than 0.5 or 50%). These training techniques can provide for boosting decision stumps, wherein a decision stump is a depth-one decision tree, which compares a single input feature to a threshold. Examples associated with a value greater than the threshold typically are assigned a label (or more generally, a score), and examples associated with values that fall below the threshold typically are assigned another score. During learning, each feature of a feature vector is examined (e.g., sequentially) to locate the feature that best classifies the data when compared to the threshold. Used in this way, this technique can provide a simple and efficient feature selection algorithm, wherein each round of boosting yields a new stump, or alternatively each round of boosting selects a new feature. It is to be appreciated that the features can be represented in the feature vector as floating point numbers (e.g., 32 (single precision), 64 (double precision), etc. bits), integers, user defined types, strings, characters, etc.

In many instance, a simple collection of stumps can yield good classification performance, while in other aspects of the invention, more complex collections are utilized. In addition, decision trees of varying depth can be employed to affect performance. In accordance with one aspect of the invention, a boosted combination of fixed depth decision trees (e.g., 3) can be employed. It is to be appreciated that lower complexity decision trees can allow for complex conditional processing of the raw features without much risk of over-fitting the data. In one aspect of the invention, a logistic algorithm can be utilized. When using a logistic rule, each example weight typically is no larger than one, which can stabilize a potentially unstable back-and-forth process of sampling and learning. However, the subject invention is not limited to a logistic version. For example, an exponential loss based rule or other rule can additionally and/or alternatively be employed. The features along with a set of ground truth class labels (e.g., which can be manually assigned) can be utilized to train the boosted classifier 320, for example, to a desired and/or automatically determined depth with a suitable number of decision trees. Optionally, a portion of the training features can be reserved for testing the boosted classifier 320. In addition, other features (not shown) can be utilized in addition or alternatively to this portion the features.

The transductive classifier 330 can utilize labels inferred by the boosted classifier 320 to generate one or more training properties that can be utilized in conjunction with the original labels to train the transductive classifier 330. The transductive classifier 330 can delineate the connected component into one or more bins in one or more X dimensional histograms, wherein X is an integer equal to or greater than one. When processing, clusters can be defined as bins in one dimensional histograms for a few connected component features, including weight (e.g., the number of pixels in the connected component), height of the connected component's bounding box, width of the connected component's bounding box, and density (e.g., the number of pixels in the connected component divided by the connected component's bounding box area). Each histogram can define a set of bins, each of which can contain a set of classified connected components. One or more histograms can be generated per feature, and one or more sets of histograms can be generated per page.

In each histogram, a range of feature values can be decomposed into equally-sized bins as a percentage of a maximum range. A total of N histograms can be utilized for each feature, wherein a first histogram has 2 bins, a second has 4 bins, and an Nth histogram has $2^N$ bins, wherein N is chosen depending on the value range of each feature. As an example, N can be 24 for weight, 12 for height, 12 for width, and 13 for density. These values can be chosen to force bins at the finest resolution to contain examples with a substantially similar feature value (e.g., exactly the same, within a predefined tolerance . . . ). Each example will fall into one bin for each of the histograms. The range of feature values can be decomposed into equally-sized bins as a percentage of the maximum range. The percentage of examples, in each bin, that is assigned the class label can be related to a final correct classification. The transductive classifier 330 can be trained with the original features and/or the properties. For example, it can learn that if a bin's width is small and the percentage of components labeled as text in it is greater than a threshold, then the indicia label 'text' is more likely to be the correct label. In the same bin, if the percentage is less than the threshold, the indicia label 'text' is less likely to be the correct label.

Generally, the text detection component 310 (the boosted and transductive classifiers 320 and 330, respectively) can be trained in one or more stages. For example, in one stage connected components and associated labels are utilized to extract a feature vector for respective connected components, wherein the labels and feature vectors are employed to train the boosted classifier 320. Connected components, represented by respective feature vectors, are then classified with the boosted classifier 320. In another stage, inferred labels are employed to bin the connected components in different histograms. Properties can then be computed for individual bins and appended to the feature vectors. The transductive classifier 330 can then be trained with the expanded feature set (e.g. the original feature vectors and the properties appended thereto) and/or the original labels. The text detection component 310 can then be utilized to detect text.

Figure 4:
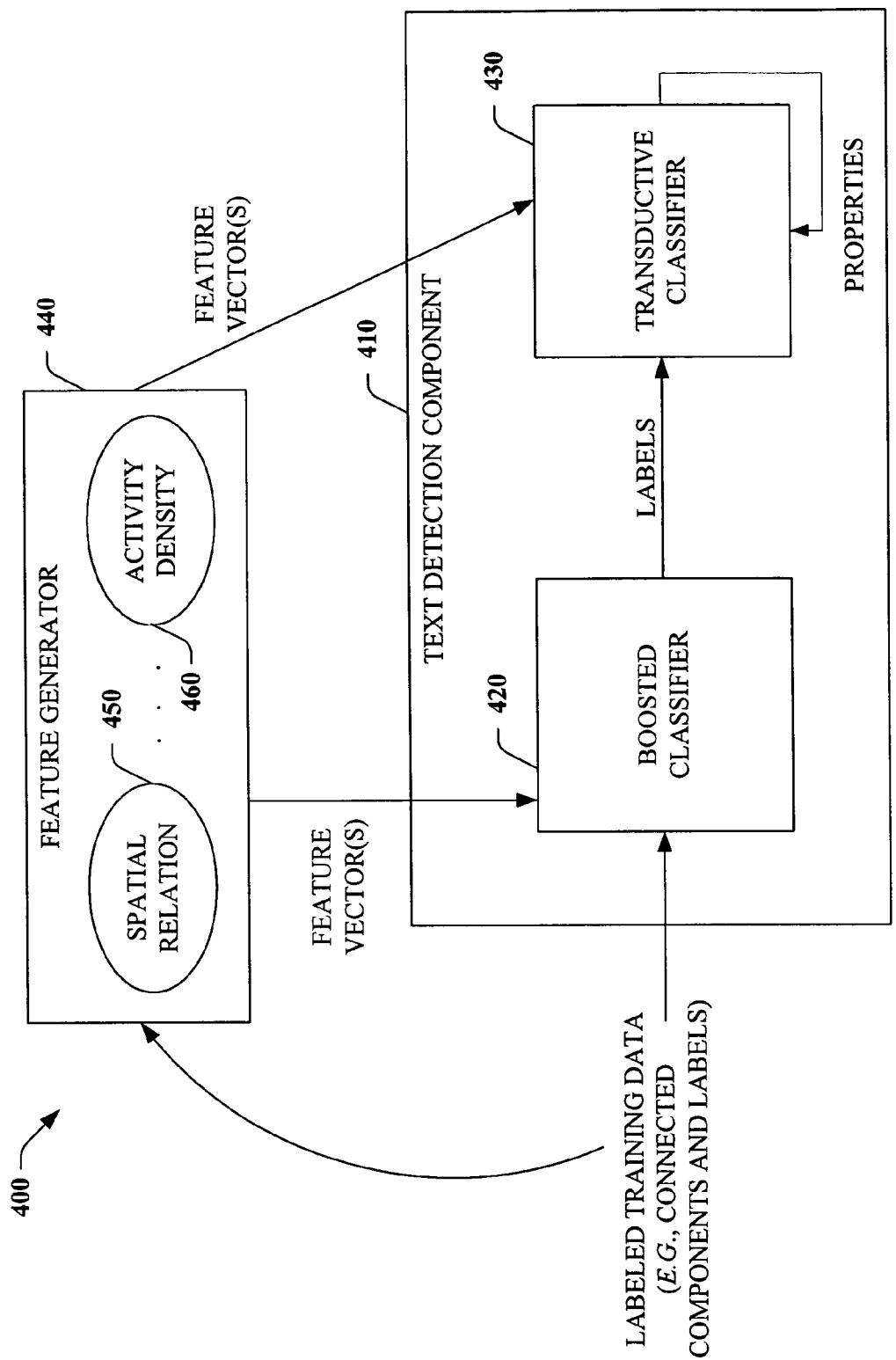
FIG. 4 illustrates an exemplary system that trains a text detector that employs a boosted and a transductive classifier for detecting text within input data.

FIG. 4 illustrates a system 400 that trains a text detector. The system 400 includes a text detection component 410 with a boosted classifier 420 and a transductive classifier 430, together, which can be trained, as described above, and utilized to detect text. The system 400 further includes a feature generator 440 that generates training features. The feature generator 440 can utilize essentially any known technique to generate features. For example, the feature generator 440 can employ one or more hand-tuned (e.g., where associated parameters are adjusted manually by visual inspection of sample documents) text detectors to generate the training features. As depicted, the feature generator 440 can employ at least two techniques to generate the features—a spatial relation technique 450 and an activity density technique 460. Both the spatial relation technique 450 and the activity density technique 460 can require many manually, or hand tuned, parameters, which can make them rather impractical as a text detectors all by themselves. However, both techniques make excellent features on which to train a boosted classifier.

The following illustrates one example of an approach that can be utilized with the spatial relation technique 450 in accordance with an aspect of the invention. Given data such as a binary image, connected components can be computed and grouped into words, lines, blocks, etc., for example, using a hierarchical bottom-up clustering based on a spatial relationship between the connected components. For instance, grouping connected components into a word can be facilitated by the following algorithm:

For all pairs of connected components (in proximity), test
   for a word grouping x1, y1, w1, h1 define bounding of
   box of connected components 1
x2, y2, w2, h2 define bounding of box of connected components 2
a, b, and c are hand tuned constants
if(x1+w1+aW<x2 &&
   x2<X1+w1+bW &&
   max(w1,h1/2)<cW2 &&)
cluster(connected components 1, connected components 2), wherein a, b, and c (and other constants) are adjusted manually by looking at sample documents. Similar techniques can be used to group words into lines, and lines into blocks. Clustering can be performed in one or more passes. For example, a conservative pass at grouping the connected components can be made to avoid incorrect grouping. Then a relatively more aggressive grouping of the connected components can be made, with one or more words and/or one or more lines in the same block. When multiple iterations are performed, respective iterations can be associated with a more complicated grouping test. In addition, block statistics (e.g. median connected components width and height) can be utilized. This approach is invariant to size scaling and can tolerate rotations (e.g., up to about 30 degrees).

The following illustrates an example of an approach that can be utilized with the activity density technique 460 in accordance with an aspect of the invention. With this approach, text detection is based on measuring activity over a fixed size region, wherein activity generally refers to a number of connected components bounding boxes that intersect a rectangular region of a given size. An underlying assumption in using activity to detect text is that "connectedness" is an underlying property of text, and that for a given font size, the connected component density is predictable. If the density is too low, the connected components are probably spec noise, long lines, or edges. If the density is too high, the connected components are probably part of a dithering pattern. A connected component is therefore classified as text if its size is within a range, and its activity measured over a region of corresponding size is also within a given range. This approach is invariant to rotation, and it is less sensitive to dithering patterns than the spatial resolution technique described above. However, this approach is not invariant to scale, so the test must be repeated at different scales.

As noted above, both the spatial relation technique 450 and the activity density technique 460 can make excellent features on which to train the classifiers 420 and 430. Thus, the spatial relation technique 450 and the activity density technique 460 can be utilized by the feature generator 440 to generate features that can be utilized to train the text detection component 410 to detect text and/or classify one or more connected components associated with data under text detection.

Figure 5:
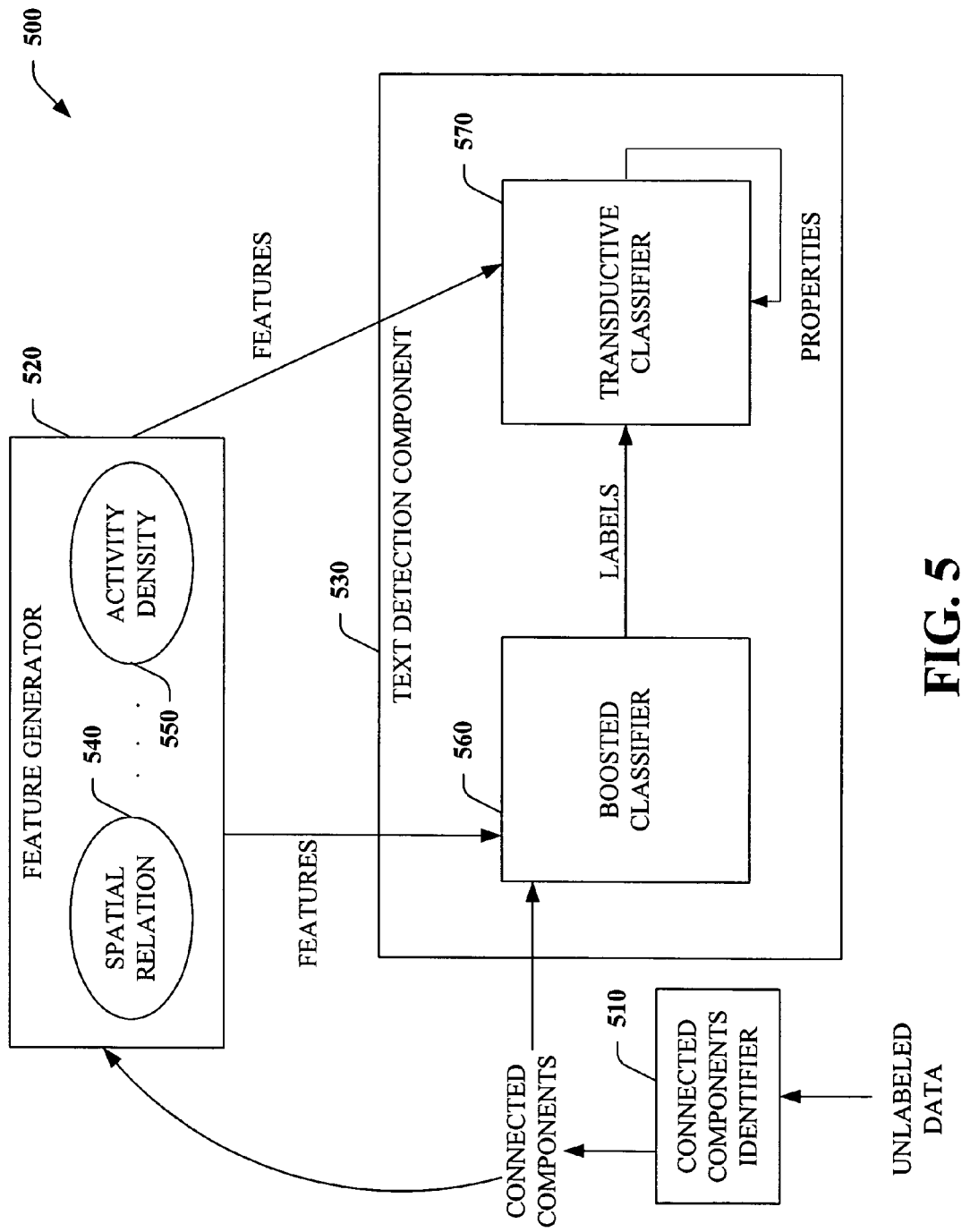
FIG. 5 illustrates exemplary system that facilitates text detection.

FIG. 5 illustrates a system 500 that facilitates text detection. The system 500 can be trained as described above and subsequently utilized to detect text in unlabeled novel data. The system 500 includes a connected components identifier 510, which identifies connected components associated with unlabeled data under text detection. The connected components identifier 510 can employ various algorithms to identify connected components. For example, the connected components identifier 510 can utilize any known union-find algorithm or the like to identify connected components. The connected components identifier 510 can provide the identified connected components to a feature generator 520.

The feature generator 520 can utilize connected components to generate features for one or more classifiers associated with the text detection component 530. It is to be understood that essentially any known techniques to generate the features can be utilized. For example, the feature generator 520 can employ one or more hand-tuned algorithms (e.g., spatial relation, activity density . . . ) to generate features as described above. A boosted classifier 560 can classify the connected components through respective feature vectors. Inferred labels can be employed to bin the connected components into a plurality of different histograms, wherein a transductive classifier 570 can compute properties (for the individual bins) that can be appended to corresponding feature vectors to generate expanded feature vectors. The connected components, represented by respective expanded feature vectors, can be classified with the transductive classifier 570.

It is to be appreciated that various binning approaches and/or clustering techniques (e.g., a k-means clustering algorithm, . . . ) can be utilized in accordance with the subject invention. The following provides an example of one such binning approach that can be utilized with the systems and/or methods described herein. Once preliminary labels have been inferred for each connected component (e.g., by running the initial boosted classifier 560 on the feature vectors that represent the connected components), they are binned based at least in part on values of particular "basic" features. For instance, with a connected component width feature each connected component has an associated width, which can be a width (e.g., in pixels) of a bounding box of the connected component. Typically, this is a directly measurable, "basic" feature of each connected component.

Suppose, for explanatory purposes, that a narrowest connected component in the set is 1 pixel wide and a widest connected component is 1024 pixels wide. In one aspect, ten histograms can be formed: one histogram with two bins, one with four bins, one with eight bins, one with sixteen bins, and so on, until the tenth histogram, which will have 1024 (or 2^10) bins is formed. In the first histogram, all connected components that are less than 512 pixels wide will be in the first bin, and all connected components that are 512 or more pixels wide will be in the second bin. A similar technique can be utilized for the other histograms. In this example, ten histograms are utilized; however, any number of histograms can be employed, for example, depending on a desired resolution. In this example, the highest resolution histogram is the one with the most number of bins, or 1024, and can be utilized to separate connected components based on one unit of feature value. For example, connected components that are 800 pixels wide will be in one bin in the tenth histogram, while connected components that are 799 pixels wide will be in a different bin, and connected components that are 801 pixels wide will be in yet another bin.

Upon determining bin membership of all the connected components in all the histograms, properties of the bins themselves can then be computed. Example of properties include, but are not limited to, a mean and/or a variance of the bin with respect to the value of the feature for the connected components in the bin, and/or a "textness" of the bin based on the inferred labels of each of the connected components in the bin. These properties of the bins can be appended as additional features onto each of the connected components feature vectors. For instance, if a connected component is determined to be a member of bin three in the second histogram in the above example, then it will get all of the properties for that bin appended to its feature vector. If four properties are calculated for each bin in each of the histograms in the above example, then each connected component will get a total of forty additional properties appended to its feature vector (e.g., four each for ten bins, since each connected component is guaranteed to belong to one and only one bin in each of the ten histograms). This binning procedure can be repeated for any number of "basic" features. Once the bin properties have been appended to each connected component's feature vector, the expanded feature vectors can be utilized to train and/or test the transductive classifier 560, which can be second boosted classifier.

Figure 6:
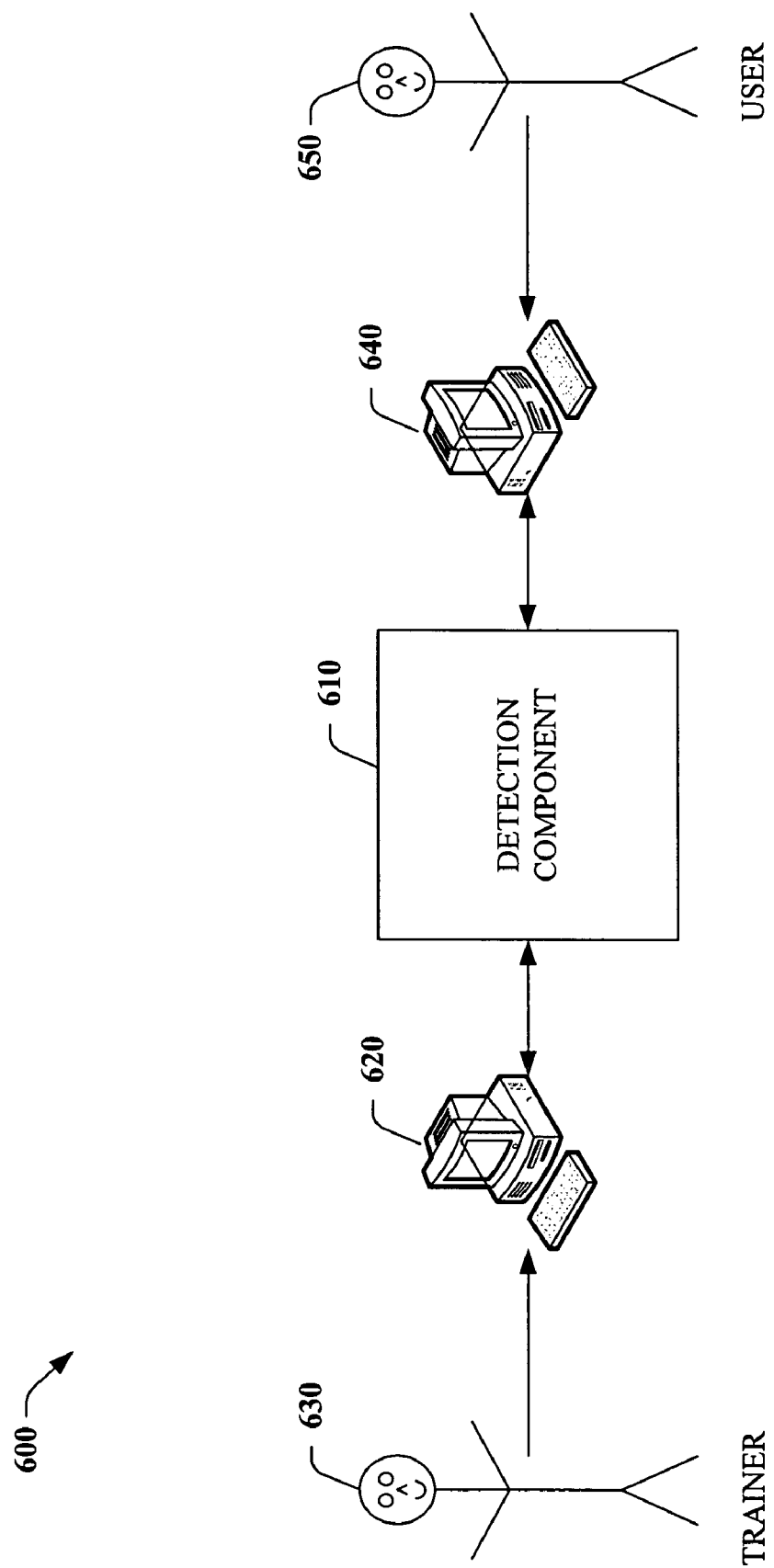
FIG. 6 illustrates an exemplary system that provides detection of text in connection with one or more types of data.

FIG. 6 illustrates a system 600 that provides text detection. The system 600 includes a text detection component 610, which can be substantially similar to the text detection components described herein. As depicted, the text detection component 610 can be employed in connection with a training system 620. A trainer 630 can provide one or more training sets (e.g., labeled data, including connected components and associated labels) to the training system 620. The training sets can include various data that includes text as well as other components. The connected components can be utilized by the text detection component 610 to generate features, which are subsequently classified, wherein inferred labels are binned and utilized to generate additional properties. The labels, features and/or properties are utilized to train the text detection component 610.

The system 600 further includes a computer 640, which can be utilized by a user 650 for text detection. The user 650 can provide the computer 640 with unlabeled data in order to detect text in the data. The text detection component 610 can be invoked by the computer 640 and utilized to detect text in the data. Connected components can be extracted from the data, wherein feature vectors can be extracted therefrom. Inferred labels can be employed to bin the connected components into a plurality of different histograms, wherein properties can be computed for the individual bins. The properties computed for each bin can be appended to a corresponding feature vector, and each connected component, represented by its expanded feature set, can be classified by the detection component 650.

Figure 7:
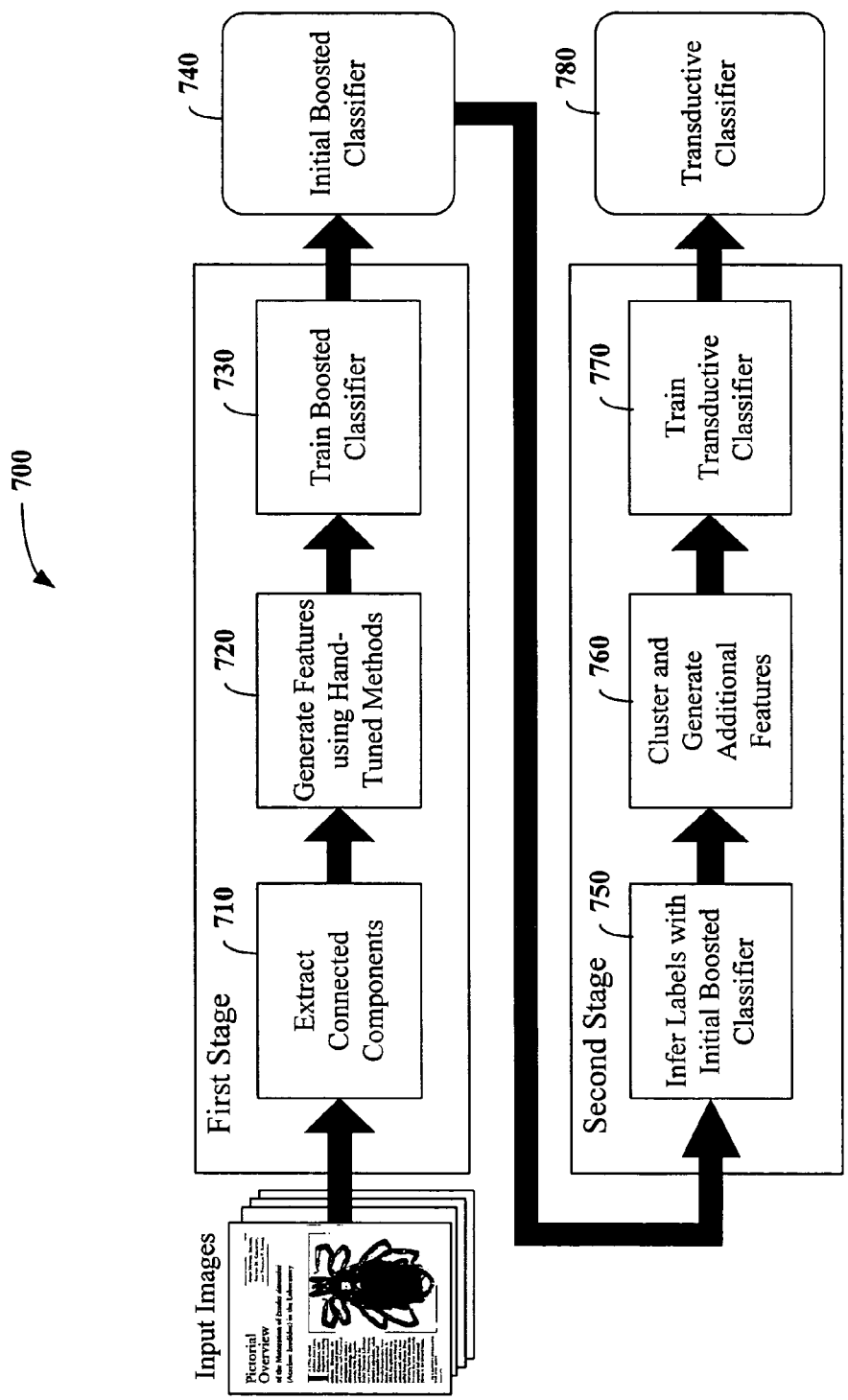
FIG. 7 illustrates an exemplary method for detecting text in various types of data.
Figure 8:
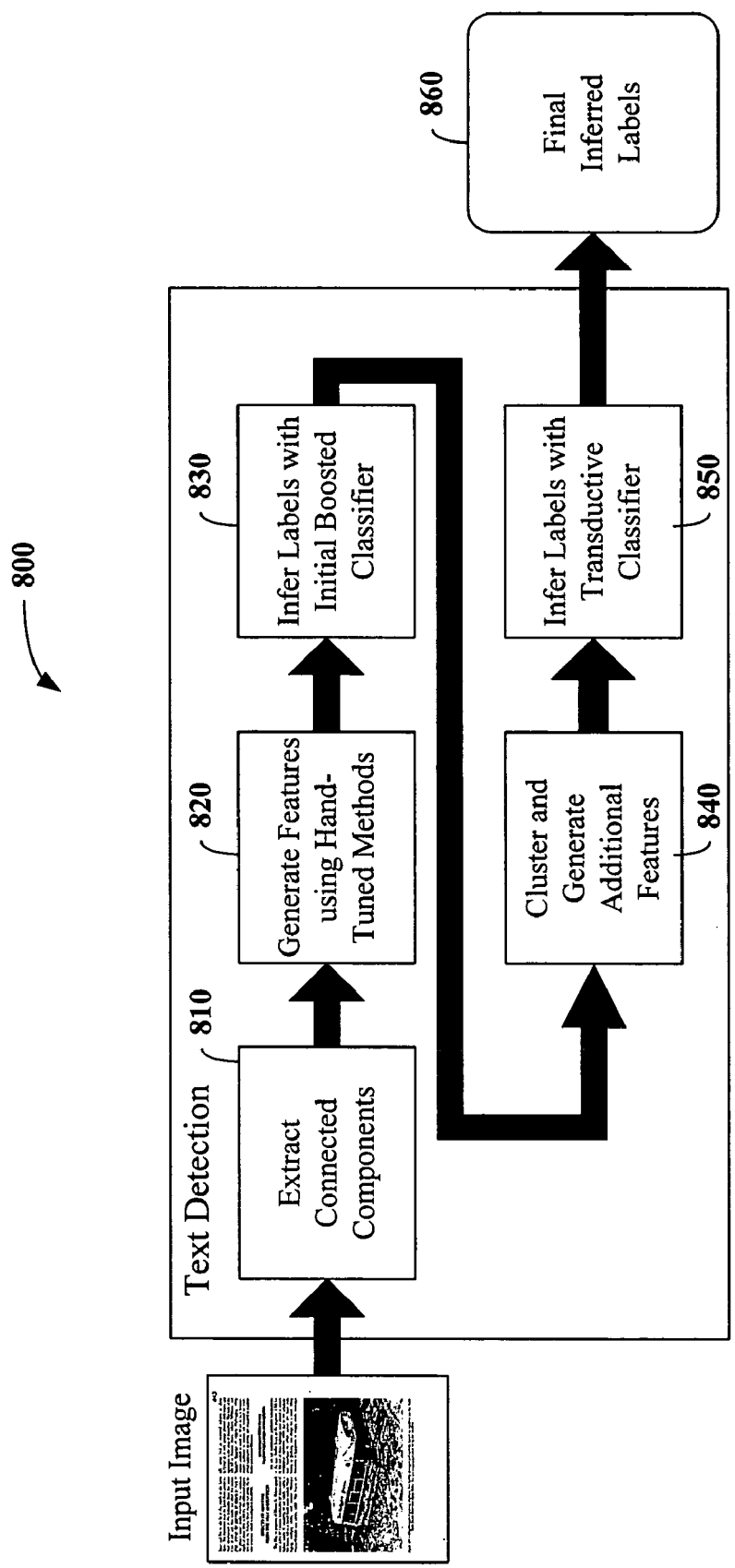
FIG. 8 illustrates an exemplary method for training a text detection system.

FIGS. 7-8 illustrate methodologies, in accordance with an aspect of the present invention. While, for purposes of simplicity of explanation, the methodologies are shown and described as a series of acts, it is to be understood and appreciated that the present invention is not limited by the order of acts, as some acts can, in accordance with the present invention, occur in different orders and/or concurrently with other acts from that shown and described herein. For example, those skilled in the art will understand and appreciate that one or more of the methodologies could alternatively be represented as a series of interrelated states or events, such as in a state diagram. Moreover, not all illustrated acts may be required to implement the methodologies in accordance with the present invention.

FIG. 7 illustrates a method 700 for training a text detection system. The method 700 can comprise two stages: a first stage can be implemented to facilitate generating/training an initial boosted classifier, and a second stage can be implemented to generate/train a transductive classifier. The first stage of the method 700 can initiate at reference numeral 710, where input images (e.g., labeled training data) can be received, and connected components can be extracted and/or identified in the data. In general, the labeled training data typically includes connected components and text and/or non-text labels for respective connected components. At reference numeral 720, a feature vector for each identified connected component can be generated using hand-tuned techniques, as set forth supra with regard to FIG. 4 (e.g., whereby associated parameters can be adjusted manually by visual inspection of sample documents, a spatial relation technique, an activity density technique, . . . ). At reference numeral 730, one or more boosted classifiers can be trained based at least in part on the generated features and given connected component labels, thereby generating the initial boosted classifier 740 and completing the first stage of the method 700.

The second stage of the method 700 can facilitate generating and/or training the transductive classifier 780. For instance, at reference numeral 750, the initial boosted classifier can be employed to infer labels for (e.g., "classify") the training data (e.g., text, non-text, . . . ). At reference numeral 760, labeled connected components can be clustered (e.g., via a K-means clustering technique) and/or binned, which can comprise associating respective connected components with bins in one of a plurality of different histograms, as detailed above with regard to FIG. 3. Once binned, additional features and/or properties can be computed for individual bins, and properties computed for each bin to which a connected component is determined to belong to can be appended to a corresponding feature vector for the connected component to generate an expanded feature vector. At reference numeral 770, each connected component, represented by its expanded feature set, can be employed to train the transductive classifier 780.

FIG. 8 illustrates a method 800 for detecting text. At reference numeral 810, unlabelled data can be received, and connected components can be extracted and/or identified in the data. At reference numeral 820, a feature vector for each identified connected component can be generated using hand-tuned methods. The feature vectors are then used to infer a label for each connected component at 830, for instance using the initial boosted classifier 740 in FIG. 7. At reference numeral 840, inferred labels can be employed to cluster and/or bin the connected components. Binning can include associating respective connected components to a bin in one or more different histograms. Once binned, properties can be computed for individual bins, and properties computed for each bin to which a connected component is determined to belong to can be appended to the feature vector of the connected component to generate an expanded feature vector. At reference numeral 850, each connected component, represented by its expanded feature set, can be classified via a transductive classifier, which can be a second boosted classifier such as 780 in FIG. 7, that infers labels for the connected component(s), based on component features and expanded feature information derived from bin analysis, to generate a plurality of final inferred labels 860, upon which the method 800 can terminate. In this manner, methods 700 and 800 can be implemented in conjunction with each other to collaboratively train and utilize the subject classifiers to infer labels for connected components in order to detect text in a received image, such as a scanned document, for example.

Figure 9:
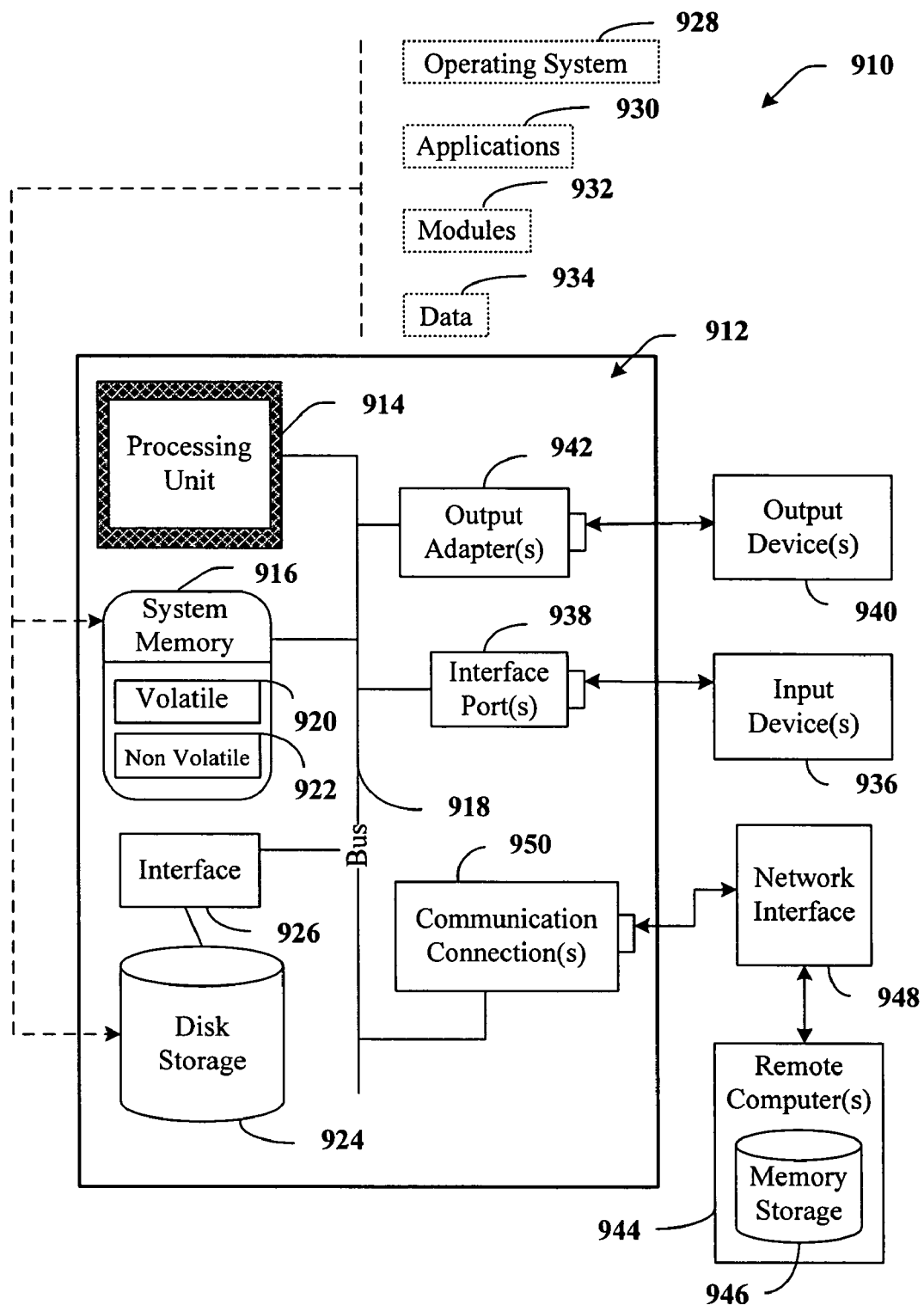
FIG. 9 illustrates an exemplary computing architecture that can be employed in connection with the subject invention.
Figure 10:
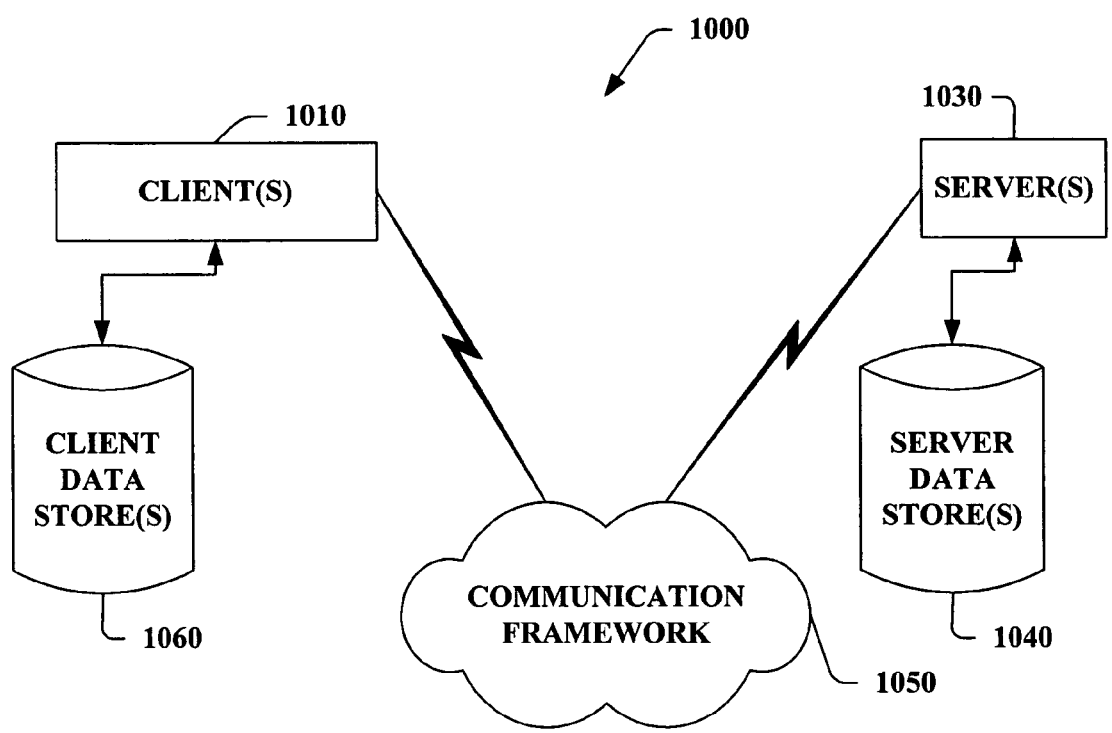
FIG. 10 illustrates an exemplary networking environment that can be employed in connection with the subject invention.

In order to provide a context for the various aspects of the invention, FIGS. 9 and 10 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), or flash memory. Volatile memory 920 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and Rambus Direct RAM (RDRAM), direct Rambus dynamic RAM (DRDRAM), and Rambus dynamic RAM (RDRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912 and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 with which the present invention can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the present invention, for example. One possible communication between a client 1010 and a server 1030 can be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system, embodied on a computer-readable storage medium, that when executed, facilitates detecting text in data, comprising:
    an input component that receives data;
    a connected components identifier that generates a set of connected components from the data, the connected components are utilized to generate a set of features for training and testing; and
    a classification component that automatically detects text in the data via a transductive classifier employed in connection with a trained boosted classifier, the trained boosted classifier infers labels for the training connected components, the inferred labels are subjected to a clustering process by which the set of training features feature sets are expanded to define training properties, the transductive classifier is trained based in part upon the training properties.

2. The system of claim 1, the connected components identifier utilizes a union-find algorithm to identify the training connected components.

3. The system of claim 1, further comprising a feature generator that generates a set of training features that are employed to train the boosted classifier and the transductive classifier.

4. The system of claim 3, the feature generator utilizes one of a spatial relation technique or an activity density technique to generate the set of features.

5. The system of claim 1, the data is one of a document, a spreadsheet, an image, a page, a web page, a video frame, or a drawing.

6. An optical character recognition (OCR) system that employs the system of claim 1 in connection with extracting text from an image.

7. A method for detecting text, comprising:
employing a processor to execute computer executable code stored on a storage medium to perform the following acts:
identifying one or more connected components associated with unlabeled data under text detection;
utilizing the connected components to extract a feature vector for each connected component;
utilizing a boosted classifier to classify each connected component represented by its respective feature vector;
employing inferred labels to bin the connected components across a plurality of bins;
computing properties for each bin; and
utilizing a transductive classifier to classify the connected components as a function of the feature vectors and corresponding computed bin properties.

8. The method of claim 7, further comprising training the boosted classifier by:
receiving labeled training data that includes connected components, text labels and nontext labels;
extracting a feature vector for each connected component in the training data; and
training the boosted classifier with the labels and feature vectors.

9. The method of claim 8, further comprising training the transductive classifier by:
employing the boosted classifier to classify each training connected component, represented by a respective feature vector;
utilizing labels inferred from the training connected components to bin the training connected components across a plurality of bins;
computing properties for each bin; and
utilizing the labels, feature vectors and properties to train the transductive classifier.

10. The method of claim 9, further comprising utilizing one of a spatial relation technique or an activity density technique to generate the feature vectors for the unlabeled data and the labeled training data.

11. The method of claim 9, the bins utilized to delineate the connected components of the unlabeled data and the training data are associated with one or more histograms that correspond to at least one of the following: a number of pixels in a connected component; a height of a connected component's bounding box; a width of a connected component's bounding box; or a number of pixels in a connected component divided by a connected component's bounding box area.

12. The method of claim 8, the transductive classifier is a second boosted classifier.

13. The method of claim 8, further comprising employing a decision tree with fixed depth in connection with the boosted classifier and the transductive classifier to allow for complex conditional processing of raw features without overfitting the data.

14. A system, embodied on a computer-readable storage medium, that when executed, trains a text detector, comprising:
means for identifying a set of connected components from at least one of unlabeled data or labeled data;
means for extracting a feature vector for each connected component identified;
means for training a boosted classifier with the connected components and corresponding text and non-text labels for text detection;
means for training a transductive classifier with as a function of an expanded feature set, the expanded feature set generated from at least one of labels, feature vectors and computed bin properties; and
means for employing the trained boosted classifier in connection with the trained transductive classifier to detect text within the unlabeled data.

15. A computer-readable storage medium having computer-executable instructions stored thereon to perform a method comprising:
receiving labeled training data that includes connected components, text labels and nontext labels;
identifying one or more connected components associated with the labeled training data;
utilizing a spatial relation technique to generate a feature vector for each of the one or more connected components identified in the labeled data;
training one or more boosted classifiers with the labels and the feature vectors;
employing the one or more trained boosted classifiers to infer labels for the training connected components;
generating one or more histograms that define a plurality of equally sized bins as a function of a percentage of a maximum range of feature values;
utilizing the labels inferred from the training connected components to bin the training connected components across the plurality of bins;
computing properties and additional features for each bin;
generating expanded feature vectors with the properties and additional features;
utilizing the original training data labels and expanded feature vectors to train a transductive classifier;
receiving unlabeled data; and
employing the trained boosted classifier and the trained transductive classifier to detect text within the unlabeled data.

16. The computer-readable storage medium of claim 15, further comprising:
providing information to an optical character recognition (OCR) system utilized to at least one of identify or extract the detected text from the unlabeled data.

17. The computer-readable storage medium of claim 15, the unlabeled data is one of a document, a spreadsheet, an image, a page, a web page, a video frame or a drawing.

18. The method of claim 9, further comprising providing information to an optical character recognition (OCR) system utilized to at least one of identify or extract the detected text from the unlabeled data.

* * * * *